(12) United States Patent
Takahashi (10) Patent No.: US 8,039,156 B2
(45) Date of Patent: Oct. 18, 2011

(54) FUEL CELL SYSTEM AND METHOD FOR REMOVAL OF IMPURITIES FROM FUEL CELL ELECTRODES

(75) Inventor: Shinichi Takahashi, Kanagawa (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 12/834,517

(22) Filed: Jul. 12, 2010

(65) Prior Publication Data

US 2010/0279182 A1 Nov. 4, 2010

Related U.S. Application Data

(62) Division of application No. 10/878,188, filed on Jun. 29, 2004, now abandoned.

(51) Int. Cl.
*H01M 8/04* (2006.01)
*H01M 8/06* (2006.01)

(52) U.S. Cl. ......................................... 429/432; 429/429

(58) Field of Classification Search .................. 429/408, 429/410, 427–433, 437–439, 452–453, 535; 204/524, 632; 205/338, 349, 510, 742, 746; 180/65.1–65.2
See application file for complete search history.

(56) References Cited

U.S. PATENT DOCUMENTS

| | | | |
|---|---|---|---|
| 3,905,884 A | 9/1975 | Parenti et al. | |
| 4,956,071 A | 9/1990 | Giuffrida et al. | |
| 5,290,405 A | 3/1994 | Joshi et al. | |
| 5,560,752 A | 10/1996 | Badding et al. | |
| 5,635,039 A | 6/1997 | Cisar et al. | |
| 5,871,859 A | 2/1999 | Parise | |
| 6,093,500 A | 7/2000 | Margiott et al. | |
| 6,187,464 B1 | 2/2001 | Yasumoto et al. | |
| 6,194,092 B1* | 2/2001 | Ohara et al. ...................... 429/9 |
| 6,432,569 B1 | 8/2002 | Zeilinger et al. | |
| 6,589,686 B2 | 7/2003 | Ovshinsky et al. | |
| 6,605,375 B2 | 8/2003 | Ovshinsky et al. | |
| 2002/0038732 A1 | 4/2002 | Sugiura et al. | |
| 2003/0207162 A1 | 11/2003 | Reiser | |
| 2004/0101734 A1* | 5/2004 | Morishima et al. ............. 429/34 |

FOREIGN PATENT DOCUMENTS

| | | |
|---|---|---|
| JP | 60-181286 A | 9/1985 |
| JP | 2001-085037 | 3/2001 |
| JP | 2005-527943 | 9/2005 |
| WO | WO 03/083975 A | 10/2003 |

OTHER PUBLICATIONS

Japanese Notification of Reasons for Rejection, w/ English translation thereof, issued in Japanese Patent Application No. JP 2005-188094 dated Nov. 10, 2009.

* cited by examiner

*Primary Examiner* — Barbara Gilliam
*Assistant Examiner* — Claire L Roe
(74) *Attorney, Agent, or Firm* — McDermott Will & Emery LLP (57) ABSTRACT

A fuel cell system and method of removing impurities from a catalyst are provided. The fuel cell system comprises a fuel cell stack comprising a pair of end plates and at least one unit cell. The unit cell contains a gas diffusion layer in contact with a membrane electrode assembly which is constructed of a polymer electrolyte membrane enclosed between two electrodes. The at least one unit cell is stacked between the end plates. The fuel cell system further comprises a voltage supply means and a means of impressing a cyclically varying voltage from the voltage supply means on the fuel cell stack. The cyclically varying voltage removes impurities that adhere to catalysts on the electrode surfaces in the fuel cell stack.

6 Claims, 7 Drawing Sheets

FUEL CELL SYSTEM AND METHOD FOR REMOVAL OF IMPURITIES FROM FUEL CELL ELECTRODES

RELATED APPLICATIONS

This application is a Divisional of U.S. patent application Ser. No. 10/878,188, filed on Jun. 29, 2004, now abandoned the disclosure of which Application is incorporated by reference herein.

TECHNICAL FIELD OF THE INVENTION

This invention relates to fuel cell systems and in particular fuel cell systems for use in motor vehicle applications.

BACKGROUND OF THE INVENTION

Fuel cells have been developed as alternative power sources for motor vehicles, such as electrical vehicles. A fuel cell is a demand-type power system in which the fuel cell operates in response to the load imposed across the fuel cell. Typically, a liquid hydrogen containing fuel, for example, gasoline, methanol, diesel, naphtha, etc. serves as a fuel supply for the fuel cell after the fuel has been converted into a gaseous stream containing hydrogen. The conversion to the gaseous stream is usually accomplished by passing the fuel through a fuel reformer to convert the liquid fuel to a hydrogen gas stream that usually contains other gases such as carbon monoxide, carbon dioxide, methane, water vapor, oxygen, and unburned fuel. The hydrogen is then used by the fuel cell as a fuel in the generation of electricity for the vehicle.

Figure 1:
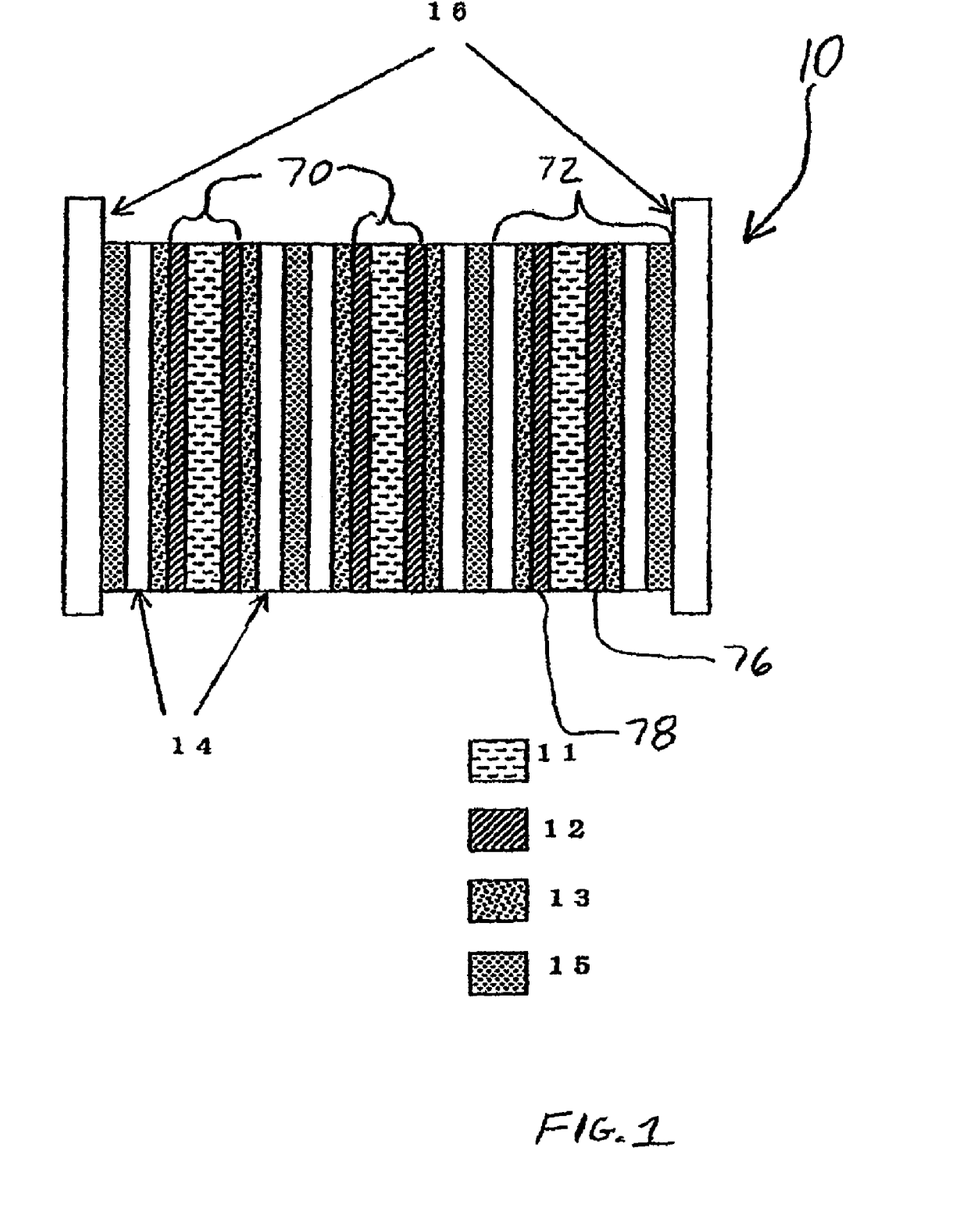
FIG. 1 schematically illustrates a cross-section of a fuel cell stack.

A polymer electrolyte membrane type of fuel cell is generally composed of a stack 10 of unit cells 72 comprising a polymer electrolyte membrane 11 enclosed between electrodes 12 and gas diffusion layers 13, and further enclosed between separators 15 and channels 14 for fuel gas and oxidant gas, as shown in FIG. 1. The stack 10 is fixed by end plates 16. A current collector may be provided between the end plate and stack, or the end plate 16 itself may function as current collector. When hydrogen is used as the fuel gas and oxygen is used as the oxidant gas, electrons are released due to a chemical reaction occurring at catalyst reaction sites on the electrode surfaces. Water is formed as a by-product, via the reaction:

$$H_2 + \tfrac{1}{2}O_2 \rightarrow H_2O.$$

Consequently, the fuel cell is an energy source that has no adverse impact on the global environment, and has been the focus of much research for use in automobiles in recent years.

From the standpoint of durability, fuel cell electrical generating performance deteriorates over its operating life, due to a build-up of impurities such as metallic ions and organics in the fuel cell. The impurities result from various sources: for example, they may be extracted from tubing used to supply gas or coolant to the fuel cell, or from auxiliary equipment. In addition, there may be impurities mixed with the fuel gas or oxidant gas. It is possible to reduce the concentration of impurities by using material that does not contain impurities for tubing or auxiliary equipment, or by filtering the fuel gas and oxidant gas. However, when generating electricity over a long period of time, it is difficult to prevent the accumulation of impurities inside the fuel cell and the accompanying deterioration of fuel cell performance. Impurities inside the fuel cell adhere to catalytic reaction sites and causes loss of catalytic performance.

There are known methods of re-activating the catalyst by electrochemically removing the impurities that adhere to it. U.S. Pat. No. 6,187,464, for example, describes a method of generating electricity in a polymer electrolyte fuel cell module at an oxygen utilization rate of 50% or higher, and impressing on the fuel cell module an average voltage of 0.3 V or less per unit cell. Japanese Patent Disclosure 2001-85037 describes another method of restoring fuel cell performance by operating the fuel cell at a current density 1.5 times greater than the normal operating current density or by reversing the direction of current flow.

SUMMARY OF THE INVENTION

There exists a need in the fuel cell art for a fuel cell system that reduces the amount of impurities adhering to catalyst reaction sites. There exists a need in the fuel cell art to prevent deterioration of fuel cell electrical generation. There exists a need in the fuel cell art for a rapid and efficient method of removing impurities from catalytic reaction sites.

There exists a need in the electrical vehicle art for electrical vehicles powered by fuel cells that rapidly and efficiently generate electricity upon demand. There exists a need in the electrical vehicle art for electrical vehicles powered by fuel cells that do not suffer from poor electrical generation performance due to the build-up of impurities.

These and other needs are met by certain embodiments of the present invention, which provide a fuel cell system which generates electricity by supplying fuel gas and oxidant gas to a fuel cell stack comprising a fuel cell stack comprising a pair of end plates and at least one unit cell containing a gas diffusion layer in contact with a membrane electrode assembly which is constructed of a polymer electrolyte membrane enclosed between two electrodes. The at least one unit cell is stacked between the end plates. The fuel cell system further comprises a voltage supply means and a means of impressing a cyclically varying voltage from the voltage supply means on the fuel cell stack.

The earlier stated needs are also met by certain embodiments of the present invention, which provide a motor vehicle comprising a fuel cell system which generates electricity by supplying fuel gas and oxidant gas to a fuel cell stack comprising a fuel cell stack comprising a pair of end plates and at least one unit cell. The at least one unit cell containing a gas diffusion layer in contact with a membrane electrode assembly which is constructed of a polymer electrolyte membrane enclosed between two electrodes. The at least one unit cell is stacked between the end plates. The fuel cell system further comprises a voltage supply means and a means of impressing a cyclically varying voltage from the voltage supply means on the fuel cell stack.

The earlier stated needs are also met by certain embodiments of the present invention, which provide a method of impressing a cyclically varying voltage on a fuel cell stack comprising providing a fuel cell stack comprising a pair of end plates and at least one unit cell containing a gas diffusion layer in contact with a membrane electrode assembly. The membrane electrode assembly is constructed of a polymer electrolyte membrane enclosed between two electrodes. The at least one unit cell is stacked between the end plates. A cyclically varying voltage is applied across the fuel cell stack using voltage supplied by a voltage supply means.

In addition, the earlier stated needs are also met by certain embodiments of the present invention, which provide a method of electrochemically removing impurities that adhere to an electrode surface in a fuel cell system comprising providing a fuel cell stack comprising a pair of end plates and at least one unit cell containing a gas diffusion layer in contact with a membrane electrode assembly. The membrane electrode assembly is constructed of a polymer electrolyte membrane enclosed between two electrodes. The at least one unit cell is stacked between the end plates. A cyclically varying voltage is applied across the fuel cell stack using voltage supplied by a voltage supply means to remove impurities from the electrode surface.

The earlier stated needs are also met by certain embodiments of the present invention, which provide a method of electrochemically removing impurities that adhere to a catalyst comprising providing a catalyst with a surface and impurities adhered to the surface. A cyclically varying voltage is applied across the catalyst surface using voltage supplied by a voltage supply means to remove the impurities from the catalyst surface.

The present invention addresses the need for a fuel cell system that rapidly and efficiently removes impurities adhered to catalysts in a fuel cell. The present invention further addresses the need for a method that rapidly and efficiently removes impurities adhered to a catalyst. The present invention also addresses the need for a motor vehicle with a fuel cell system that generates electricity without deterioration of performance over the operating life of the fuel cell because of impurity build up on the fuel cell catalyst surfaces.

The foregoing and other features, aspects, and advantages of the present invention will become apparent in the following detailed description of the present invention when taken in conjunction with the accompanying drawings.

DETAILED DESCRIPTION OF THE INVENTION

The present invention provides a fuel cell system that rapidly and efficiently removes impurities adhered to catalysts. The present invention also provides a motor vehicle with a fuel cell system that generates electricity without deterioration of performance over time due to impurity build-up on fuel cell catalysts. These benefits are provided by applying a cyclically varying voltage to a fuel cell stack.

Figure 2:
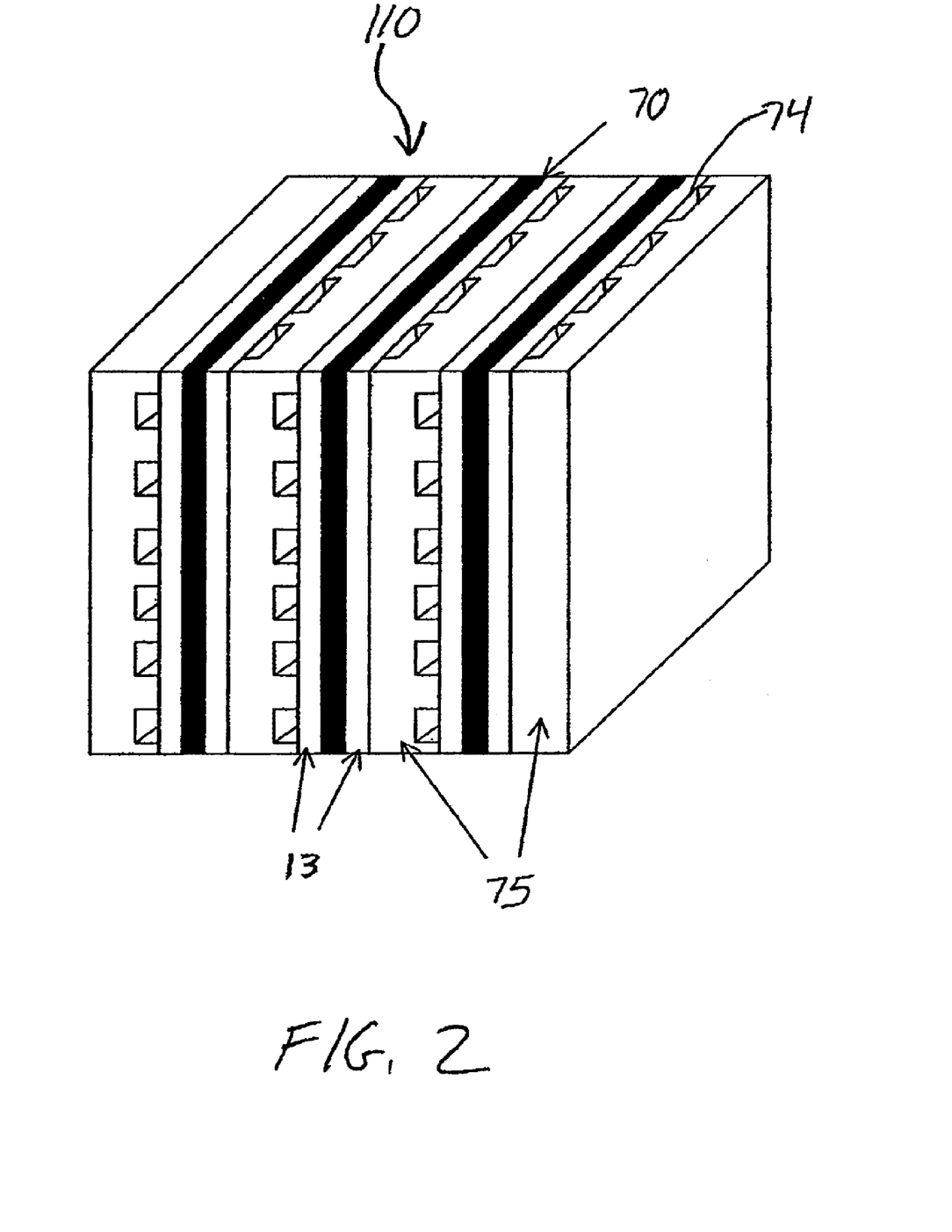
FIG. 2 schematically illustrates an outline of a fuel cell stack.

A fuel cell stack 10 used in certain embodiments of the present invention is illustrated in FIG. 1. The fuel cell stack 10 comprises at least one unit cell 72 equipped with a membrane electrode assembly 70 constructed of a polymer electrolyte membrane 11 enclosed between two electrodes 12, gas diffusion layers 13, and a separator 15. Fuel gas and oxidant gas are supplied to the unit cells via gas channels 14 and the unit cells 72 are stacked between end plates 16. An alternate embodiment of the fuel cell stack 110 used in certain embodiments of the present invention is illustrated in FIG. 2. In this embodiment the gas channels 74 are located in the separator 75.

The method of electrochemically removing impurities that adhere to a catalyst involves either breaking the bond between impurities and catalyst, or changing the chemical structure by breaking down the impurities, or a combination of both. It is difficult to completely remove the impurities by merely using an electrical generation method that is different from the normal electrical generation mode because the bonds between the impurities and the catalyst is caused by the generation of electricity. Therefore, the chemical reaction in the presence of the catalyst when attempting to remove the impurities is not different from the chemical reaction that bonded the impurities to the catalyst. It is possible, however, to break the bond between catalyst and impurities by imposing a voltage on the fuel cell because it produces an opposite reaction to that of generating electricity. However, because the impurities are varied, the bonds formed between impurities and the catalyst are also varied, and it may not be possible to break all bonds between catalyst and impurities by merely imposing a specific voltage. Furthermore, even if the bonds between the impurities and the catalysts are broken, the impurities would bond with the catalyst again when electrical generation was re-started, causing deterioration of performance.

Figure 3:
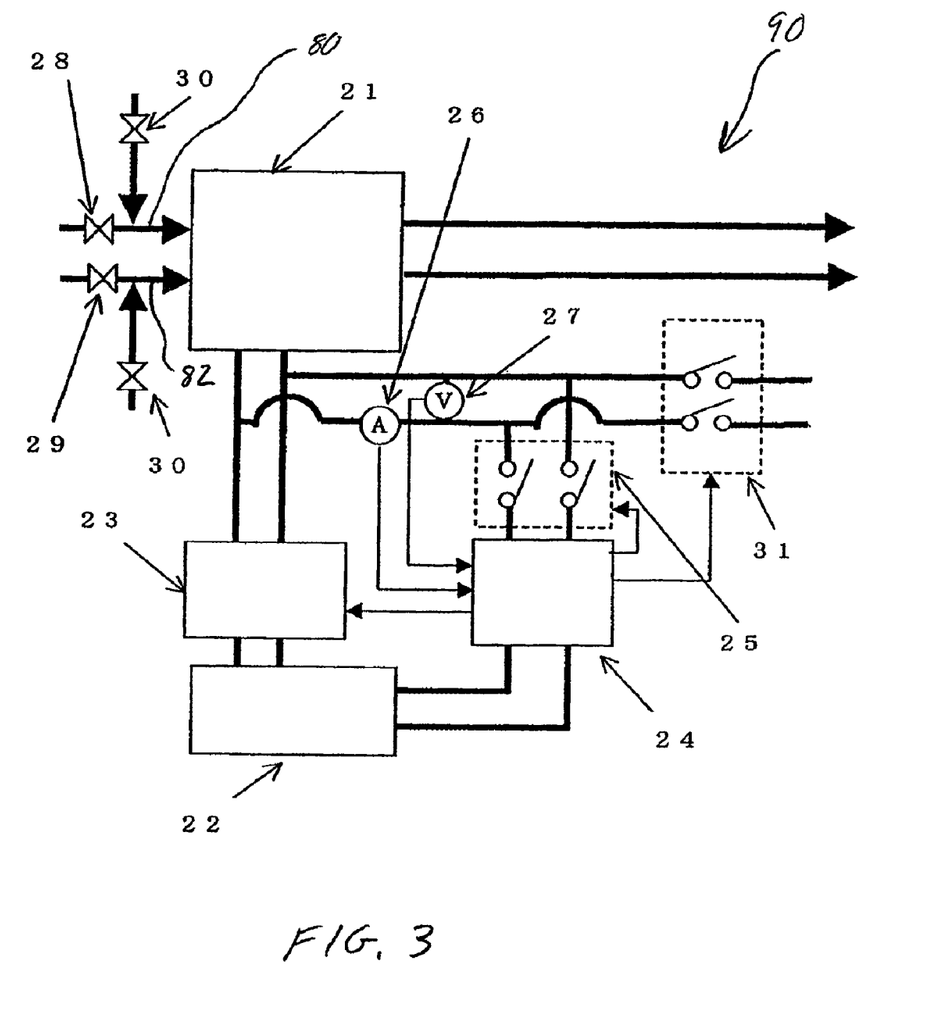
FIG. 3 illustrates a fuel cell system according to an embodiment of the present invention, as described in Example 1.

In certain embodiments of the present invention, a fuel cell system 90 comprises a membrane electrode assembly 70 whose structure encloses a polymer electrolyte membrane 11 between a fuel electrode 76 and an oxidant electrode 78, and a fuel cell stack 21 composed of unit cells 72 whose structure encloses the membrane electrode assembly 70 between separators 15 and channels 14 for fuel gas and oxidant gas. The fuel cell system 90 has means 80, 82 of supplying fuel gas and oxidant gas to the fuel cell stack 21, a secondary battery 22 charged by the fuel cell stack 21, and a means 24 of impressing a cyclically varying voltage on the fuel cell stack 21 using electric power from the battery 22, as illustrated in FIG. 3. Using the cyclically varying voltage, it is possible to remove various impurities that adhere to the surface of the fuel cell catalyst. The impurities that adhere to the catalyst surface have varied chemical structures, and likewise varied bond properties. Consequently, it is possible to break the bonds of various impurities to the catalyst, in accordance with the various bond properties, by impressing a voltage that cyclically increases and decreases between positive and negative voltage. Because the chemical structure of the impurities is broken down by impressing the cyclically varying voltage, and the impurities are changed to substances with different chemical structures, the broken-down impurities can easily be discharged from the catalyst area to outside the fuel cell stack after electrical generation is re-started. Even if there is a large quantity of impurities, it is possible to eliminate them by applying a cyclically repeating impressed voltage.

In certain embodiments of the present invention, the battery 22 can be recharged by a generator. In certain other embodiments of the present invention, the battery 22 can be replaced with a generator.

In certain embodiments of the present invention, the means 24 of impressing a cyclically varying voltage on the fuel cell stack impresses the cyclically varying voltage on the fuel cell stack 21 either before the fuel cell stack 21 starts to generate electricity, or after the fuel cell stack 21 stops generating electricity, to keep catalyst free of impurity adhesion when the fuel cell is generating electricity.

In certain embodiments of the present invention, the means 24 of impressing a cyclically varying voltage on the said fuel cell stack 21 is controlled so that it cyclically varies the voltage per unit cell of the fuel cell stack 21 in a range of between about −1.5 V and about 1.5 V to eliminate impurities with varied chemical structures and varied bond properties. Impressed voltages below about −1.5 V per unit cell could promote degradation of the catalyst. Impressed voltages above about 1.5 V per unit cell would have little effect in eliminating impurities.

In certain embodiments of the present invention, the means 24 of impressing a cyclically varying voltage on the fuel cell stack 21 is controlled so that it cyclically varies the voltage at a rate falling in a range of between about 1 mV/s and about 1000 mV/s. Though the voltage could be varied at a rate below about 1 mV/s, it would not be practical, since it would make the processing time extremely long. It is also possible to vary the voltage at a rate exceeding about 1000 mV/s, however, this would shorten the duration of electrical action on the impurity/catalyst bond, and would thus make it necessary to increase the number of voltage cycles, thereby increasing the processing time.

In certain embodiments of the present invention, the fuel cell system comprises a means 24 of impressing a cyclically varying voltage on the fuel cell stack that is controlled so the voltage varies linearly between the lowest and highest impressed voltages to eliminate impurities bonded to the catalyst.

In certain embodiments of the present invention, the fuel cell system 90 has a means 26 of measuring the current flowing in the fuel cell stack when the cyclically varying voltage is impressed on the fuel stack 21. The cyclically varying voltage is controlled so that it ceases to be impressed if the measured current at a specified voltage falls below a predetermined amperage. Thus, if the measured current at a specified voltage falls below a predetermined amperage, it can be concluded that impurities adhered to the catalyst have been eliminated. It can be empirically determined what current at a specified voltage corresponds to a state of no impurities adhered to the catalyst. The cyclically varying voltage can be switched off when the measured current reaches the specified amperage. Ideally, the predetermined amperage that is the criterion for judging that impurities have been eliminated would be 0 A. However, in cases where complete elimination would be time-consuming and would obstruct the operation of the fuel cell system, the criterion need not necessarily be 0 A. The specified current can be empirically determined to be at a level that does not obstruct electricity generation.

In certain embodiments of the present invention, the fuel cell system 90 is controlled so that the cyclically varying voltage ceases to be impressed if the current flowing in the fuel cell stack falls below a predetermined amperage in the range of from about 0.3 V to about 0.8 V per unit cell, indicating the substantially complete elimination of impurities that have a hydroxyl base. Ideally, the predetermined amperage that is the criterion for judging that impurities have been eliminated would be 0 A. However, in cases where complete elimination would be time-consuming and would obstruct the operation of the fuel cell system, it is not necessary that predetermined amperage be 0 A.

Figure 4:
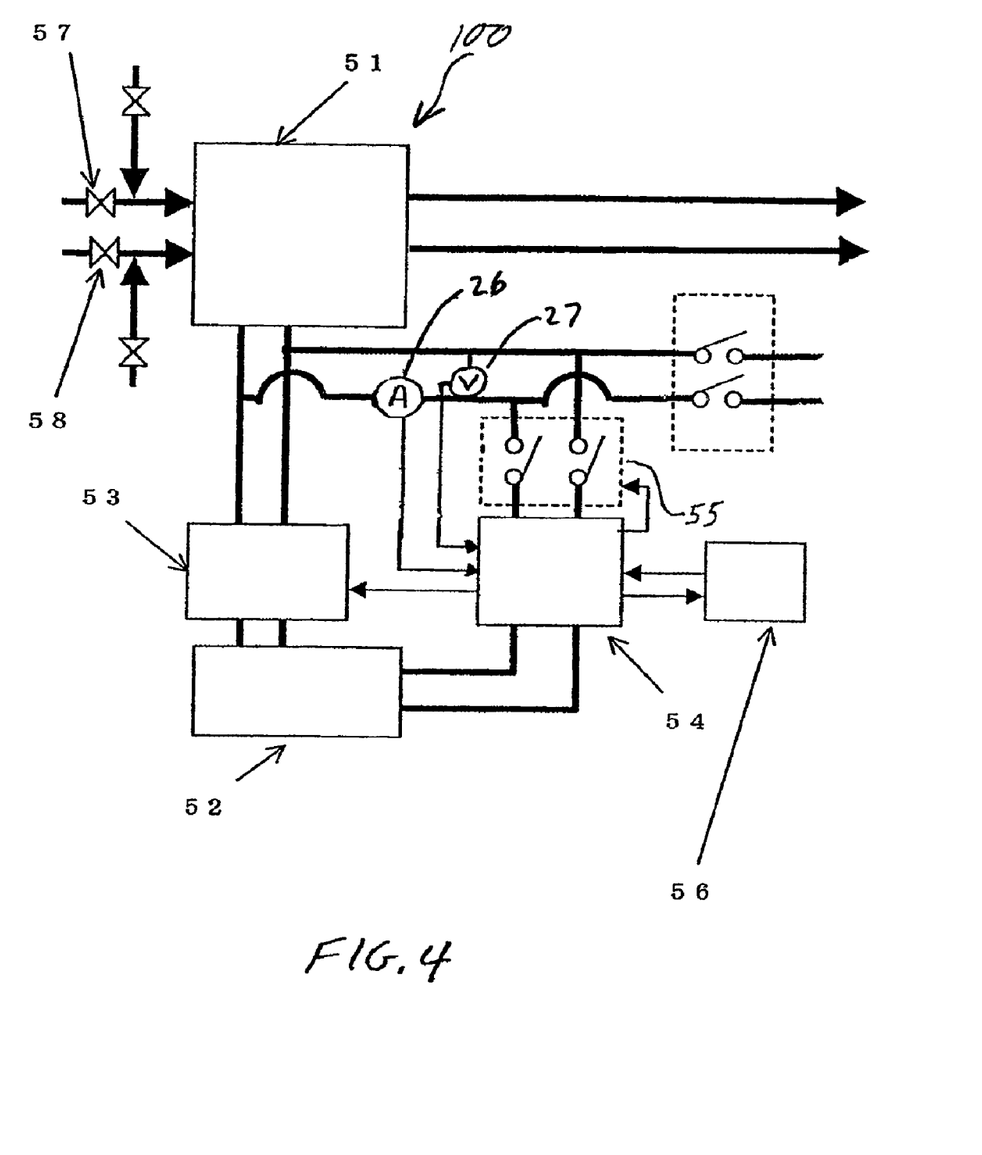
FIG. 4 illustrates a fuel cell system according to an embodiment of the present invention, as described in Example 2.

In certain embodiments of the present invention, a fuel cell system 100 comprises a means 56 for measuring the time for which cyclically varying voltage is impressed on the fuel cell stack, as illustrated in FIG. 4. A means 54 of impressing a cyclically varying voltage on the fuel cell stack 51 is controlled so that it ceases to impress a voltage on the stack when a predetermined time has elapsed. The optimum time for the impurity elimination process can be empirically determined for a predetermined degree of deterioration in the electrical generation performance of the fuel cell stack 51 and the operational status of the fuel cell system 100.

Figure 5:
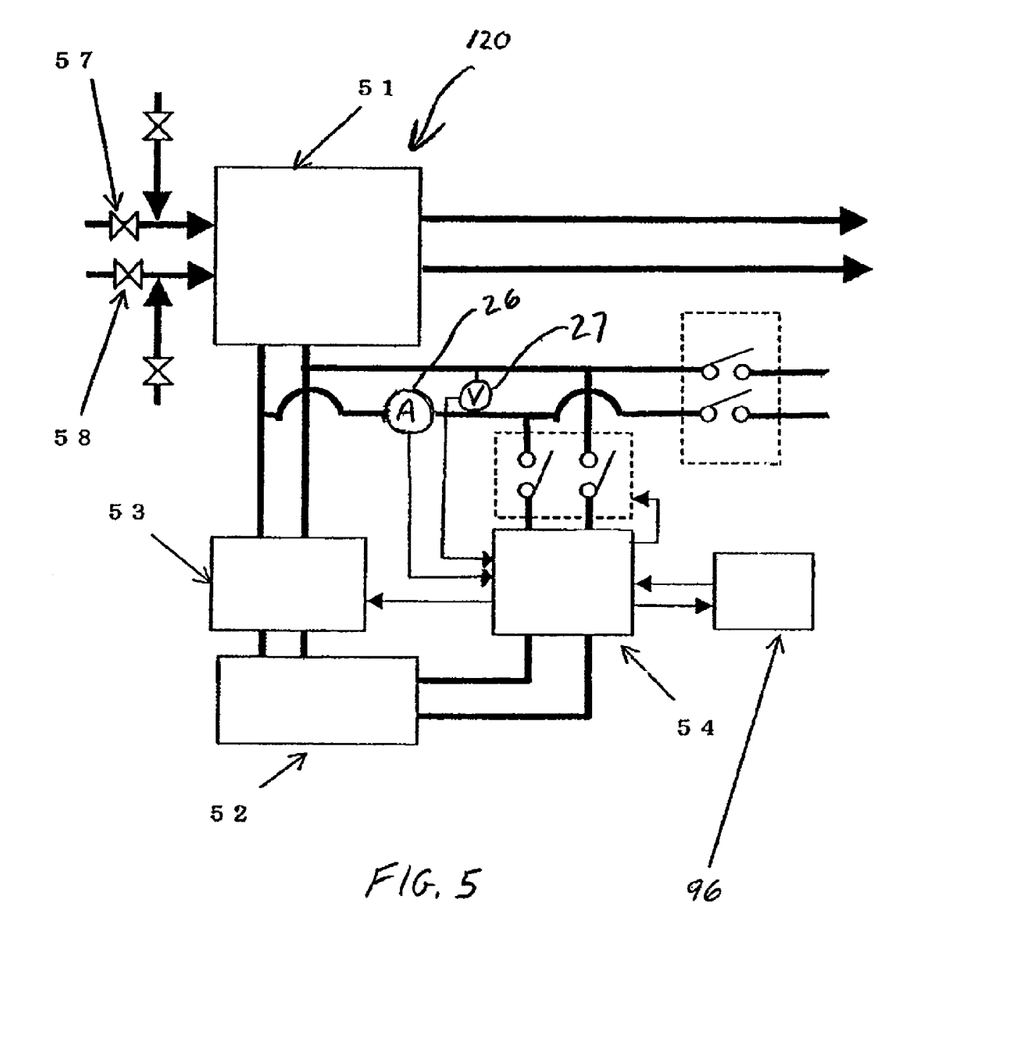
FIG. 5 illustrates a fuel cell system according to an embodiment of the present invention.

In certain embodiments of the present invention, a fuel cell system 120 comprises a means 96 of measuring the number of cycles for which the cyclically varying voltage is impressed on the fuel cell stack, as illustrated in FIG. 5. The means 54 of impressing a cyclically varying voltage on the fuel cell stack is controlled so that it ceases to impress a voltage on the stack when a predetermined number of cycles has elapsed. It is, therefore, possible to set an empirically determined optimum time for the impurity elimination process, factoring in the degree of deterioration in electrical generation performance of the fuel cell stack 51 and the operational status of the fuel cell system 120.

Figure 6:
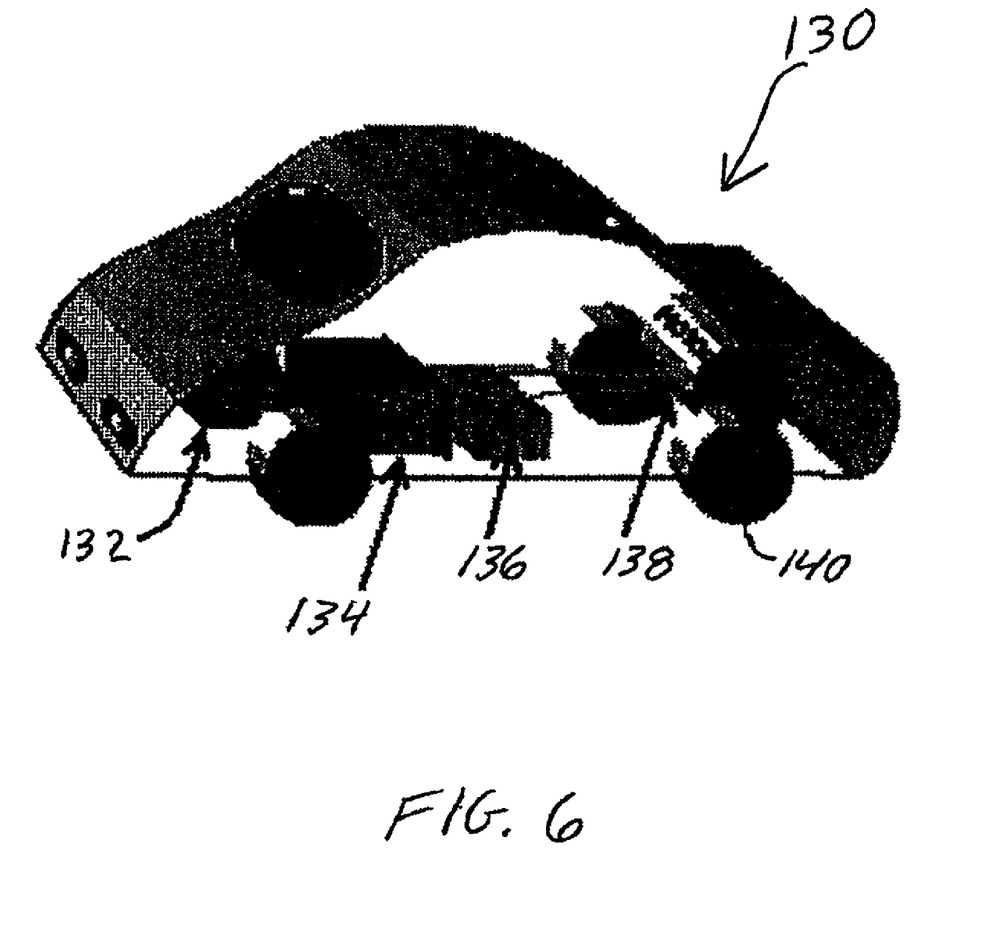
FIG. 6 illustrates an automobile with a fuel cell system according to an embodiment of the present invention.

In certain embodiments of the present invention, a motor vehicle is provided, such as an automobile 130, as shown in FIG. 6, comprising any of the fuel cell system as previously described herein. The automobile 130 comprises a fuel tank 132 to store the fuel required by the fuel cell 134 to generate electricity. The electricity generated by the fuel cell 134 is stored in one or more batteries 136. The electricity generated by the fuel cell and/or stored in one or more secondary batteries 136 is used to run the motor 138. The motor, in turn, spins the wheels 140 setting the automobile 130 in motion.

Example 1

FIG. 3 shows the outline of the fuel cell system used in Example 1. Hydrogen gas is supplied to a fuel cell stack 21 via a hydrogen supply valve 28, and air is supplied via an air supply valve 29. A battery 22, such as a secondary battery, and the fuel cell stack 21 are connected via a battery control device 23. The means 24 of impressing a cyclically varying voltage on the fuel cell stack is connected to the battery 22, and is connected to the fuel cell stack 21 via a switch 25 for impressing voltage on the fuel cell stack 21. While the fuel cell stack 21 is generating electricity, the battery control device 23 is connected, and the switch 25 for impressing voltage on the fuel cell stack 21 is shut off. When the fuel cell stack 21 ceases generating electricity the switch 25 is closed and the cyclically varying voltage is impressed on the fuel cell stack 21. The strength of the current impressed on the fuel cell stack 21 is measured by an ammeter 26, and voltage is measured by a voltmeter 27. The measurement readings of the ammeter 26 and voltmeter 27 are fed-back to the means 24 of impressing a cyclically varying voltage on the fuel cell stack.

Figure 7:
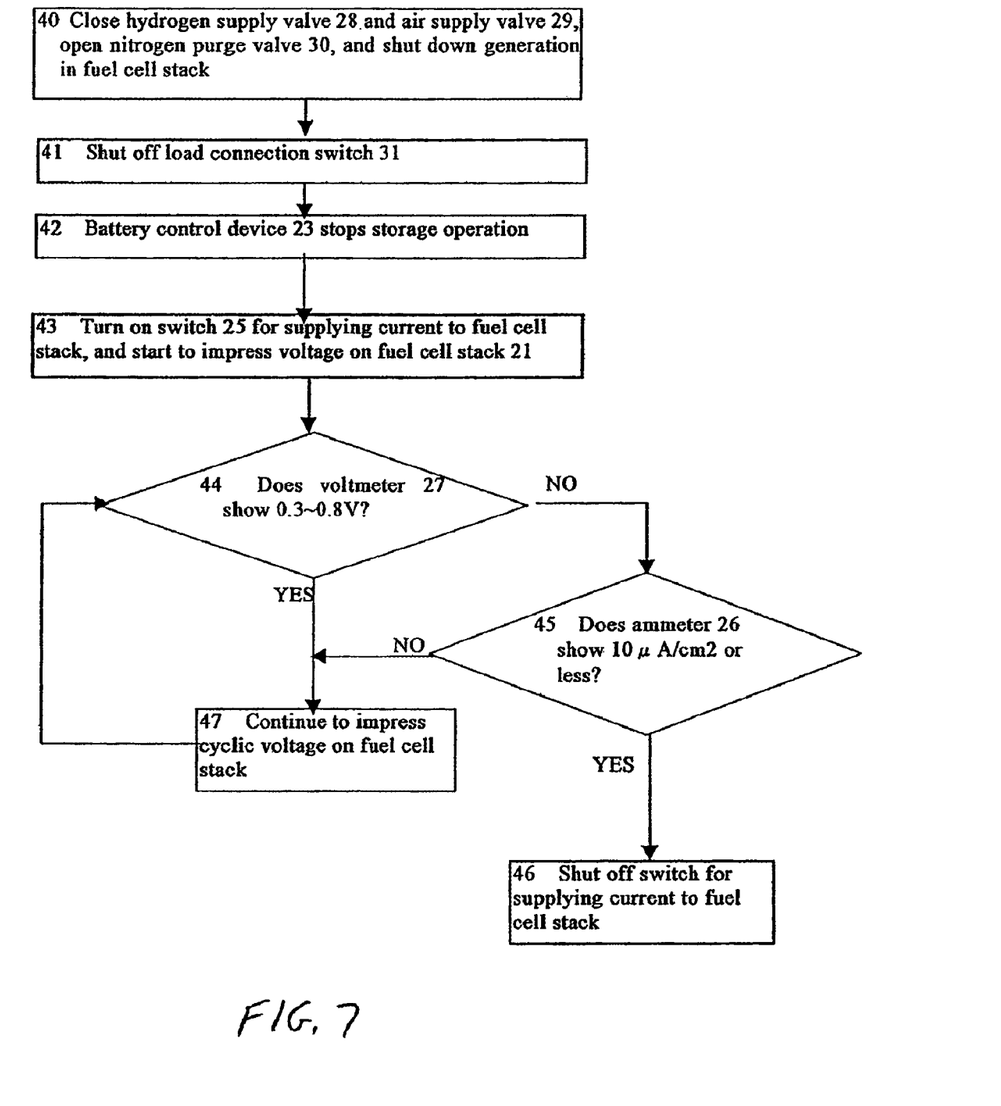
FIG. 7 is a flow chart illustrating the operation of the means of controlling the cyclically varying voltage impressed on a fuel cell stack.

FIG. 7 shows a flow chart of the fuel cell system control of the cyclically varying voltage. At step 40, the supply of hydrogen and air to the fuel cell stack 21 is stopped, and a nitrogen purge is started, by opening nitrogen purge valve 30. At step 41, the load connector switch 31 is shut off. Then, at step 42, the battery control device 23 is shut off, and the storage operation is stopped. At step 43, the means 24 of impressing a cyclically varying voltage on the fuel cell stack 21 turns on the switch 25 for impressing voltage on the fuel cell stack 21, and voltage starts to be impressed on the fuel cell stack 21. In certain embodiments of the present invention, the voltage is varied in a range of between about −0.2 V and about 1.2 V at a rate of about 50 mV/s. At step 44, it is determined whether or not the impressed voltage is in a range of between about 0.3 V and about 0.8 V. At step 45, the amperage is determined. If the amperage, converted to current density, is 10 $\mu A/cm^2$ or less, it is judged that the impurities have been eliminated, and the impression of voltage on the fuel cell stack 21 is stopped at step 46. If the current density is not 10 $\mu A/cm^2$ or less when the impressed voltage is in the voltage range of between 0.3 and 0.8 V the means 24 of impressing a cyclically varying voltage on the fuel cell stack 21 continues to impress the cyclically varying voltage. In certain embodiments of the present invention, the current density of 10 $\mu A/cm^2$, noted above, was determined empirically. When the fuel cell stack 21 was re-started after shutdown, no deterioration of generation performance was observed.

Example 2

FIG. 4 shows the outline of the fuel cell system 100 used in Example 2. Hydrogen gas is supplied to fuel cell stack 51 via a hydrogen supply valve 57, and air is supplied via an air supply valve 58. A secondary battery 52 and the fuel cell stack 51 are connected via a battery control device 53. A means 54 of impressing a cyclically varying voltage on the fuel cell stack is connected to the battery 52, and is also connected to the fuel cell stack 51 via a switch 55 for impressing voltage on the fuel cell stack. While the fuel cell stack 51 is generating electricity, the battery control device 53 is connected, and the switch 55 for impressing voltage on the fuel cell stack 51 is shut off. A timer 56 measures the length of time for which the means 54 of impressing voltage on the fuel cell stack 51 is impressed the voltage on the stack 51. When the timer 56 reaches a predetermined time, the means 54 of impressing a cyclically varying voltage on the fuel cell stack is instructed to stop impressing the voltage.

In a certain embodiment of the present invention, the voltage was varied between 0 V and 1.2 V at a rate of 100 mV/s. The timer 56 was set to an impression of cyclically varying voltage duration of 1800 seconds.

The current impressed on fuel cell stack 51 is measured by an ammeter 26, and voltage is measured by a voltmeter 27. The current and voltage values measured by the ammeter 26 and voltmeter 27 are fed-back to the means 54 of impressing a cyclically varied voltage on the fuel cell stack.

In certain embodiments of the present invention, a means 96 for measuring the number of cycles for which the cyclically varying voltage is impressed on the fuel cell stack 51 is provided, as shown in FIG. 5. The means 96 for measuring the number of cycles for which the cyclically varying voltage measures a predetermined number of cycles. When the predetermined number of cycles is reached the means 54 of impressing a cyclically varying voltage on the fuel cell stack is instructed to stop impressing the voltage. The predetermined number of cycles can be empirically determined.

The embodiments illustrated in the instant disclosure are for illustrative purposes. They should not be construed to limit the scope of the claims. Though the fuel cell systems described are particularly well suited to electrical vehicles, such as automobiles, the instant fuel cell systems are suitable for a wide variety of motor vehicles that are included within the scope of the instant claims including, motorcycles, buses, trucks, recreational vehicles, and agricultural and industrial equipment. As is clear to one of ordinary skill in this art, the instant disclosure encompasses a wide variety of embodiments not specifically illustrated herein.

What is claimed is:

1. A method of electrochemically removing impurities that are adhered to catalyst reaction sites on electrodes of a fuel cell stack due to reaction in the fuel stack during generation of electricity, comprising the steps of:

impressing a cyclically varying voltage on the fuel cell stack when generation of electricity by the fuel cell stack is stopped;

varying the cyclically varying voltage in a predetermined range to break bonds between the impurities and the catalyst reaction sites and break down chemical structures of the impurities until a predetermined condition is met; and discharging the broken down impurities from the catalyst reaction sites after restarting generation of electricity by the fuel cell stack.

2. The method as claimed in claim 1, wherein the predetermined range is a range of between −1.5 V and 1.5 V.

3. The method as claimed in claim 1, wherein the cyclically varying voltage varies at a rate falling in a range between 1 mV/s and 1000 mV/s.

4. The method as claimed in claim 1, wherein the predetermined condition is met when electric current flowing in the fuel cell stack falls below a predetermined amperage.

5. The method as claimed in claim 1, wherein the predetermined condition is met when time for which the cyclically varying voltage is impressed on the fuel stack reaches a predetermined period of time.

6. The method as claimed in claim 1, wherein the predetermined condition is met when the number of cycles for which the cyclically varying voltage varies reaches a predetermined number.

* * * * *